(12) United States Patent
Chen et al.

(10) Patent No.: US 6,354,716 B1
(45) Date of Patent: Mar. 12, 2002

(54) LIGHT CURTAIN DEVICE

(75) Inventors: Bo Su Chen, Garland, TX (US); Richard A. Alderman, Freeport, IL (US)

(73) Assignee: Honeywell International INC, Morristown, NJ (US)

(*) Notice: Subject to any disclaimer, the term of this patent is extended or adjusted under 35 U.S.C. 154(b) by 0 days.

(21) Appl. No.: 09/631,904

(22) Filed: Aug. 4, 2000

(51) Int. Cl.⁷ .............................................. F21V 13/04
(52) U.S. Cl. ..................... 362/268; 362/259; 250/221
(58) Field of Search ................. 359/583, 584, 359/587; 250/221, 222.1; 362/237, 268, 259

(56) References Cited

U.S. PATENT DOCUMENTS

| | | |
|---|---|---|
| 3,704,396 A | 11/1972 | Macdonald |
| 3,746,863 A | 7/1973 | Pronovost |
| 3,805,061 A | 4/1974 | De Missimy et al. |
| 4,015,122 A | 3/1977 | Rubinstein |
| 4,196,961 A | 4/1980 | Walter et al. |
| 4,266,124 A | 5/1981 | Weber et al. |
| 4,302,105 A | 11/1981 | Sick |
| 4,431,309 A | 2/1984 | Sick et al. |
| 4,553,842 A * | 11/1985 | Griffin .................. 356/621 |
| 4,749,853 A | 6/1988 | Salim |
| 4,818,666 A | 4/1989 | Weber |
| 4,980,547 A | 12/1990 | Griffin |
| 5,003,169 A | 3/1991 | Sakaguchi et al. |
| 5,015,840 A | 5/1991 | Blau |
| B1 5,015,840 | 5/1991 | Blau |
| 5,117,221 A | 5/1992 | Mishica, Jr. |
| 5,198,661 A | 3/1993 | Anderson et al. |
| 5,281,809 A | 1/1994 | Anderson et al. |
| 5,302,942 A | 4/1994 | Blau |
| 5,505,313 A | 4/1996 | Smith et al. |
| 5,628,410 A | 5/1997 | Smith et al. |
| 5,909,210 A * | 6/1999 | Knox .................. 345/168 |
| 6,124,586 A | 9/2000 | De Coi |
| 6,175,419 B1 | 1/2001 | Haque et al. |

OTHER PUBLICATIONS

Sick Optic–Electronics, Inc., Jun. 17, 1998, The Latest (Release May 1, 1998)/US (http://www.sickoptic.com/home.htm).

* cited by examiner

Primary Examiner—Alan Cariaso
Assistant Examiner—Hargobind S. Sawhney
(74) Attorney, Agent, or Firm—Marshall, Gerstein & Borun; Andrew A Abeyta

(57) ABSTRACT

A light curtain device for creating a curtain of light between a reflective first location and a second location is disclosed. The device includes a light source adapted to provide a light column, a plurality of beam splitters, a plurality of light detectors, and an indicator arranged to indicate the interruption of the light column. The beam splitters are disposed to intersect the light column at intervals, and each of the beam splitters is adapted to direct a deflected portion of the light column toward the first location. The reflective first location receives the deflected portion of the light column from each of the beam splitters and reflects each deflected portion toward the second location. The light detectors are disposed adjacent the second location, with each of the light detectors being operatively associated with a corresponding one of the beam splitters and being positioned to the receive its corresponding deflected portion reflected by the reflector.

34 Claims, 3 Drawing Sheets

LIGHT CURTAIN DEVICE

FIELD OF THE INVENTION

The present invention relates to a light curtain device for use in industrial applications such as part measurement, part verification, part inspection and/or part profiling.

BACKGROUND OF THE INVENTION

Light curtains have a number of known applications. For example, light curtains are commonly employed in industrial applications to perform a variety of measurement and inspection functions. Light curtains are often used in order to size parts, verify part features such as edges, holes and other distinguishing characteristics, and for verification of part ejection and bin picking. Light curtains may also be used on many types of industrial machinery, such as punches, presses, drills, saws, etc., in order to sense the presence of foreign objects and, further, are often found on security and/or safety systems. A number of other industrial applications also are well known.

Light curtain devices typically employ a number of light beams that are disposed to fan out across a designated location in a production line. Typically, such devices employ a plurality of active elements on both sides of the area to be monitored. For example, a plurality of light generators, each of which generates a light beam or column, may be disposed on one side of the monitored area, and a corresponding plurality of light detectors may be disposed on the other side of the monitored area. The interruption of one or more of the light columns thus indicates, for example, the presence of a part at the monitored area, and tracking of which light columns are interrupted can be used, for example, to determine the type or orientation of the part at the monitored location.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

In accordance with a first aspect of the invention, a device for creating a curtain of light between a first location, the first location having a reflector, and a second location, includes a light source adapted to provide a light column, a plurality of beam splitters, and a plurality of light detectors. The beam splitters are disposed to intersect the light column at intervals, and each of the beam splitters is adapted to direct a deflected portion of the light column toward the first location. The reflector adjacent the first location is positioned to receive the deflected portion of the light column from each of the beam splitters. The reflector reflects each deflected portion toward the second location. A plurality of light detectors is disposed adjacent the second location, with each of the light detectors being operatively associated with a corresponding one of the beam splitters and being positioned to receive its corresponding deflected portion reflected by the reflector.

In further accordance with a preferred embodiment, the light source is a vertical cavity surface emitting laser and can be adapted to provide a pulsing light column, while the reflector can be a retroreflector stripe. A collimating lens can be positioned to intersect the light column. Preferably, an additional light detector is positioned to intersect and monitor the condition of the light column. Indicators arranged to indicate the interruption of the light paths can be provided.

The beam splitters can comprise glass elements, such as generally planar glass elements, and can be disposed at a predetermined angle relative to the light column. The glass elements can be coated and will preferably provide reflection of about 8 percent. Preferably, each of the beam splitters will have a coating adapted so that the deflected portion directed by each of the beam splitters will have a similar relative intensity. The glass elements further can have a thickness in the range of about 0.25 mm to about 1.0 mm. Alternatively, the glass elements can be sawn Pyrex® wafers having a thickness of about 0.25 mm, although other dimensions can work, as will become apparent to those skilled in the art. A collimating lens can be associated with each of the light detectors.

In accordance with another aspect of the invention, a device for creating a curtain of light between a first location and a second location includes a light source adapted to provide a light column and at least one beam splitter disposed to intersect the light column, with the beam splitter being arranged to deflect at least a portion of the light column toward the first location. A reflector is disposed adjacent the first location in a positioned to receive the deflected portion of the light column from the beam splitter, with the reflector being arranged to reflect the deflected portion toward the second location. A light detector is disposed adjacent the second location in a position to receive the deflected portion of the light column reflected by the reflector, and an indicator is arranged to indicate the interruption of the deflected portion of the light column.

In accordance with a further aspect of the invention, a device for creating a curtain of light between a first location and a second location includes a light source adapted to provide a light column, a plurality of beam splitters disposed to intersect the light column at intervals, with each of the beam splitters being adapted to direct a portion of the light column toward a corresponding reflector disposed adjacent the first location, and with each reflector being adapted to reflect the portion of the light column toward a corresponding light sensor disposed adjacent the second location. An indicator is arranged to indicate the interruption of any one of the one or more of the deflected portions.

In accordance with yet another aspect of the invention, a device for creating a plurality of light beams between a first location and a second location comprises a single active light source adapted to provide a main light column, a plurality of beam splitters disposed to intersect the main light column, one or more reflectors disposed generally adjacent the first location, and one or more light detectors disposed generally adjacent the second location. Each of the beam splitters is spaced at intervals along the main light column, with each of the beam splitters being adapted to split a portion of light from the main light column and to direct its split portion of light toward the first location. Each of the one or more reflectors is positioned so that each split portion of light from the light column is reflected toward the second location. Each of the one or more light detectors is positioned so that each split portion of the light column is received by a corresponding one of the light detectors. Each of the light detectors is arranged to indicate the interruption of at least any one of the split portions.

In accordance with a still further aspect of the invention, a device for creating a curtain of light between a first location and a second location comprises a light source adapted to provide a light column along a first path, and first and second beam splitters. Each of the beam splitters is disposed at intervals along the first path to intersect the light column. The first beam splitter is adapted to direct a portion of the light column toward the first location along a second path, and the second beam splitter is adapted to direct a portion of the light column toward the first location along a third path. A reflector is disposed adjacent the first location and is positioned to intersect the second and third paths. The reflector is adapted to direct a portion of the light column toward the second location along a fourth path, and is further adapted to direct a portion of the light column toward the second location along a fifth path. A light detector is positioned to intersect the fourth and fifth paths.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only; because various changes and modifications within the scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE PREFERRED EMBODIMENT

The embodiment described herein is not intended to be exhaustive or to limit the scope of the invention to the precise form disclosed. The following embodiment has been chosen and described in order to best explain the principles of the invention and to enable others skilled in the art to follow its teachings.

Figure 1:
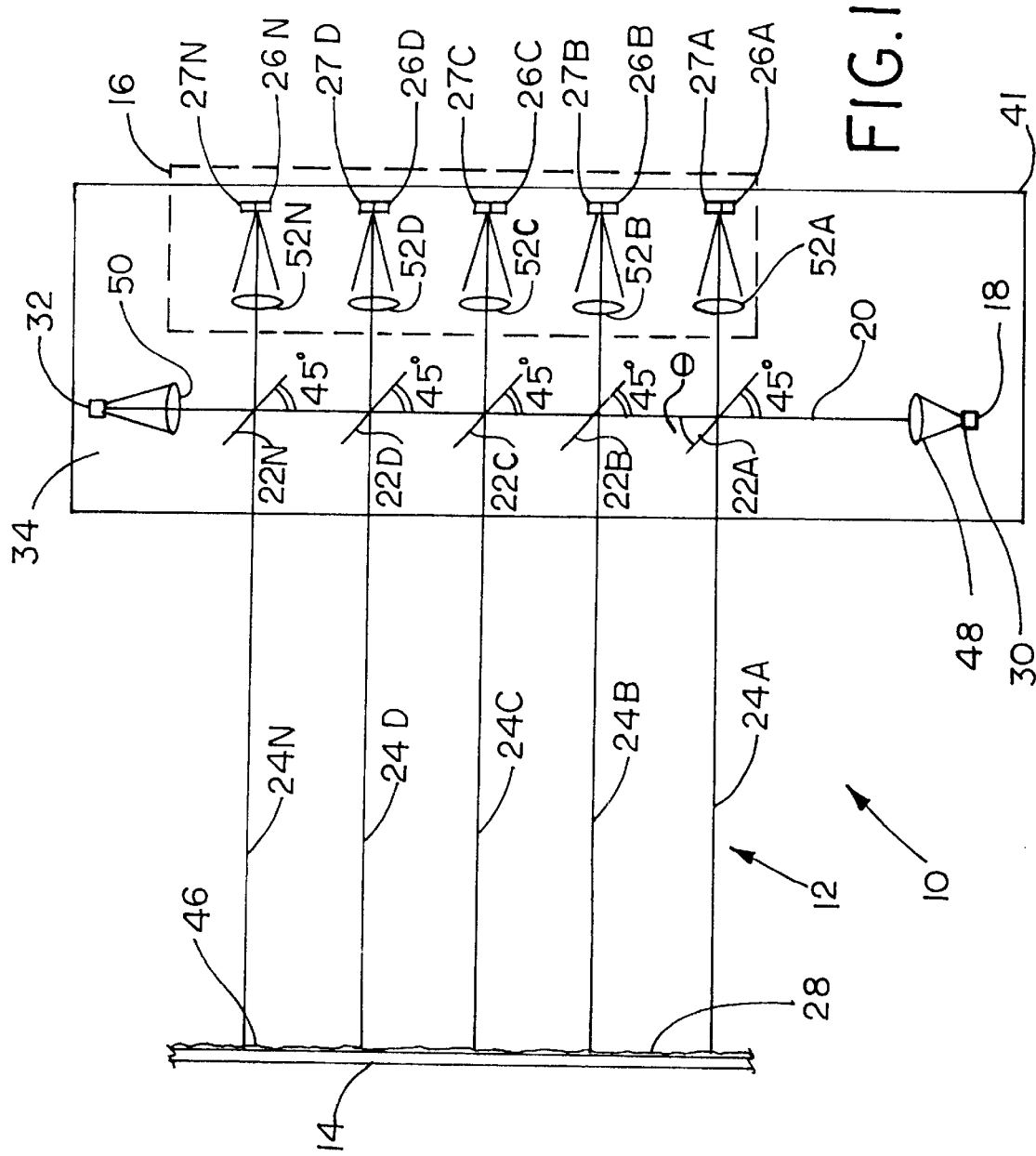
FIG. 1 is a schematic diagram of a light curtain device assembled in accordance with the teachings of the present invention.

Referring now to FIG. 1 of the drawings, a light curtain device constructed in accordance with the teachings of the present invention is shown and is generally referred to by the reference numeral 10. The light curtain device 10 can be intended for use to monitor an area 12 between a first location 14 and a second location 16. The light curtain device 10 includes a light source 18 which is adapted to provide a light column 20.

A number of beam splitters 22A, 22B, 22C, . . . 22N are mounted to a suitable supporting surface or structure (not shown) so as to intersect the light column 20 at desired intervals. The beam splitter 22A is positioned at an angle θ with respect to the light column 20, so as to deflect a portion of the light in the light column 20 away from the light column 20 and toward the first location 14 along a path 24A. Similarly, each of the remaining beam splitters 22B–22N can be positioned at the same angle θ with respect to the light column 20 so as to deflect a corresponding portion of the light column 20 toward the first location along the corresponding paths 24B–24N.

A number of light detectors 26A–26N are mounted to a suitable support surface or structure (not shown) adjacent the second location 16. Each of the light detectors 26A–N will preferably include an output 27A–27N, respectively, which indicates whether light is being received by the associated detector above a threshold level as would be known. Alternatively, each of the detectors 26A–26N can be operatively connected to a separate indicator system (not shown). Each of the detectors is preferably a Pre-Amp Photodiode (PDP) light detector having a sensitivity to about 850 nanometers. A more detailed description of one example of a suitable light detector is found in U.S. Pat. No. 5,872,646 issued to Alderman et al. A suitable detector can have either integral or separate amplifiers. Suitable detectors are commercially available and can be obtained from the Sensing and Control Division of Honeywell, Inc., located in Freeport, Ill., as well as from other commercial sources.

A reflector 28 is mounted adjacent the first location 14 in a position to intersect (i.e., in a position to reflect) the light traveling along each of the paths 24A–24N, so as to reflect the light flowing along the respective paths back toward the second location 16, where the light is received by a corresponding one of the light detectors 26A–26N.

Preferably, the light source 18 is a vertical cavity surface emitting laser (VCSEL) having an active on-pulse width between about 200 nanoseconds and about 2 microseconds. Preferably, the off time would be between about 30 microseconds and about 300 microseconds, although this range can be varied depending upon the application. Alternatively, depending on the spacing between the light detectors 26A–26N, other suitable commercially available light generators or light sources can be employed, such as other lasers, LED's, incandescent bulbs, etc.

Preferably, the light source 18 is mounted to a supporting structure or frame (not shown) at a third location 30. A monitoring detector 32 can be provided, which monitoring detector 32 is mounted to a supporting frame work or structure (not shown) adjacent a fourth location 34. In the embodiment shown, the first and second locations 14, 16 are spaced along an axis that is disposed generally perpendicular to the light column 20 extending between the light source 18 and the monitoring detector 32 (i.e., between the third and fourth locations 30, 32). Accordingly, each of the beam splitters 22A–22N is disposed at an angle θ of approximately 45 degrees with respect to the light column 20, such that each of the light paths 24A-24N extends perpendicular to the light column 20.

Figure 3:
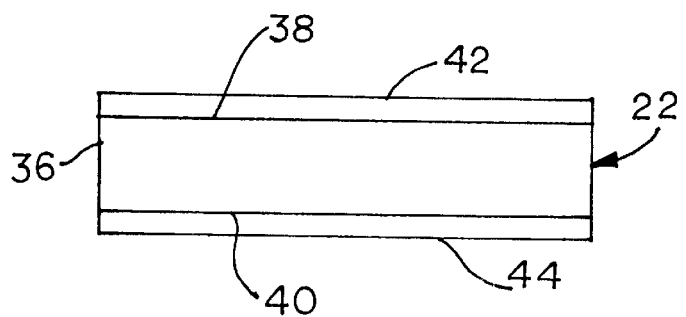
FIG. 3 is an enlarged edge view of a glass element constructed in accordance with the teachings of the present invention and adapted for use with the light curtain device of FIGS. 1 and 2.

Referring now to FIG. 3, a beam splitter 22 representative of each of the beam splitters 22A–22N is shown. The beam splitter 22 is preferably constructed of a glass plate 36 having a pair of generally planar surfaces 38, 40. Conventional glass slides commonly used in a chemical laboratory have been shown to be suitable. However, in order to achieve more precise control over the optical properties of the beam splitter 22, the beam splitter 22 can include an optical coating 42, 44 on each of the surfaces 38, 40, respectively. As would be known to those of skill in the art, the coating can provide the beam splitter 22 with the desired reflective, refractive and other optical properties. The beam splitter 22 accordingly will have a reflection of about 8%, although a reflection in the range of about 6% to about 10% may be acceptable. Still preferably, the beam splitter 22 will have a thickness in the range of about 0.25 mm to about 1.0 mm, with a thickness of about 0.5 mm being preferred. Alternatively, the beam splitter 22 can be constructed of a sawn Pyrex® wafer having a thickness of about 0.25 mm.

Still preferably, the coating 42, 44 on each of the beam splitters 22A–22N can be variable in order to counteract decay of the light column 20. This variable coating, wherein the coatings 42, 44 on the beam splitter 22A are different than the coatings 42, 44 on the beam splitter 22B, etc., will ensure that the light directed toward each of the light detectors 26A–26N will have a similar relative intensity. As an alternative, the trigger threshold on each of the light detectors can be set at different levels.

The reflector 28 is preferably a retroreflector stripe 46 of the type that is commonly employed in the art and which is commercially available. Alternatively, a number of separate reflectors can be employed.

The light curtain device 10 also includes a collimating lens 48 (FIGS. 1 and 2) mounted adjacent the light source 18, and also includes a collimating lens 50 mounted adjacent the monitoring detector 32. A collimating lens 52A can be mounted generally adjacent the light sensor 26A. Similarly, collimating lenses 52B–52N can be mounted adjacent each of the light sensors 26B–26N.

Figure 5:
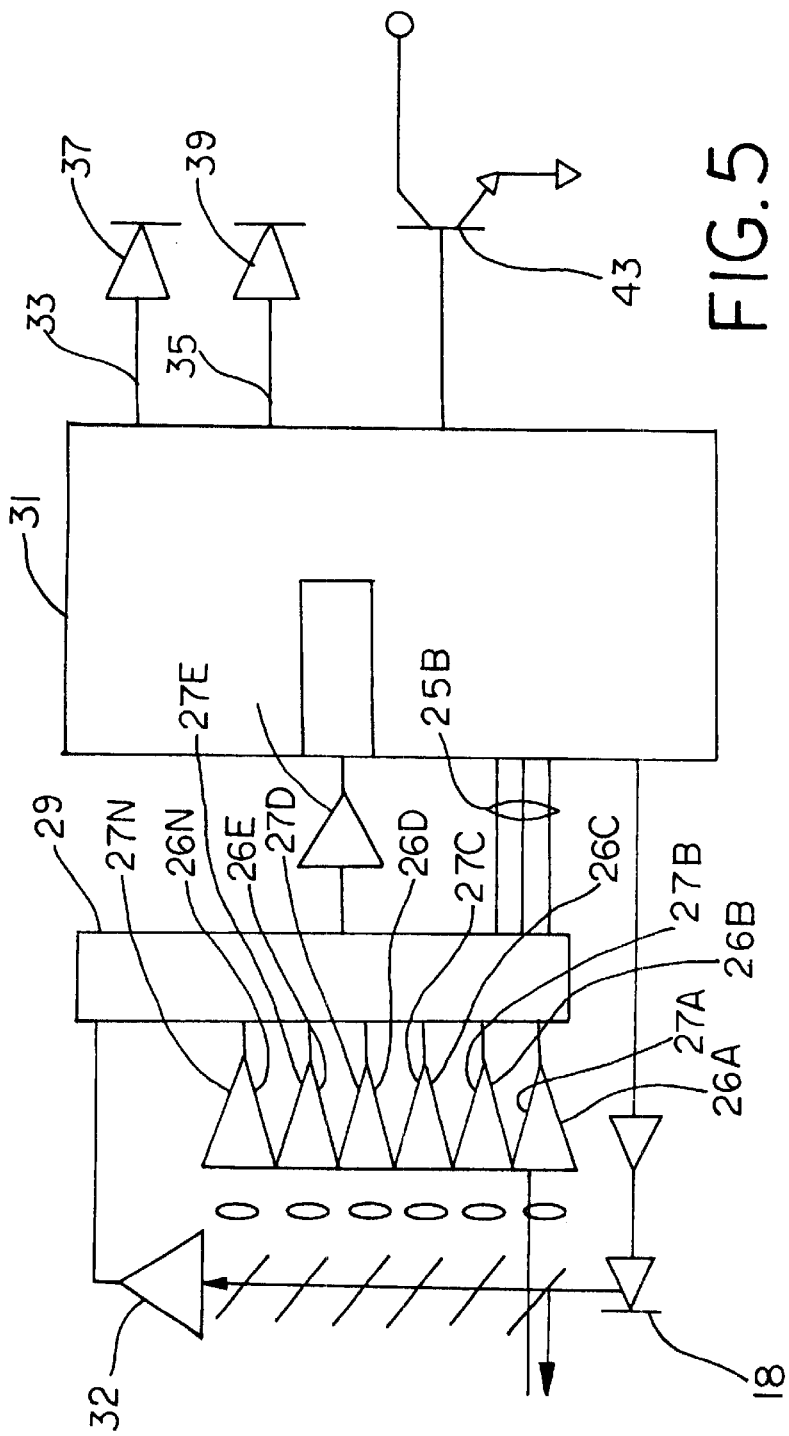
FIG. 5 is an isometric view of a housing constructed in accordance with the teachings of the present invention for housing all or part of the active elements of the light curtain device.

As shown in FIG. 5, the outputs 27A–27N are preferably connected to a multiplexer 29, which in turn is connected to a microprocessor 31, such as that which is identified by numbers COP822CJ or COP840CJ and which are available in commercial quantities from National Semiconductor. Preferably, an amplifier 25A is provided between the multiplexer 29 and the microprocessor 31 to provide a desired signal proportional to the threshold light level at the light detectors 26A–26N. Also, a three-to-eight decoder 25B is provided between the multiplexer 29 and the controller 31 in order to determine which channel is being sampled. Alternatively, a number of amplifiers could be used.

The microprocessor 31 includes a pair of outputs 33, 35. The outputs 33, 35 preferably are connected to a red indicating light 37 and a green indicating light 39 (FIG. 4) (other indicating colors can be employed). The microprocessor 31 is arranged so that the red indicating light 37 is indicative of a break in at least one of the light paths 24A–24N, while the green light 39 indicates that the light source 18 is functioning properly, and light is being received by each of the light detectors 26A–26N. While the present invention has been described using indicator lights, other indicators can be employed as will become apparent to those skilled in the art.

In operation, the first and second locations 14, 16 are chosen to be located on opposite sides of the area 12 to be monitored. The light source 18 and the monitoring detector 32 are mounted adjacent the third and fourth locations 30, 34, respectively, such that the light column 20 created by the light source 18 will be perpendicular to an axis extending between the locations 14,16 as outlined above. The monitoring detector will monitor the operating condition of the light source 18. The beam splitters 22A–22N are suitably mounted so as to be spaced apart along the light column 20 at intervals of approximately 0.75 inches, while the first and second locations 14,16 are spaced apart to give a scanning distance of approximately 4 feet with a signal level of about three times to about four times above the sensing trigger threshold of the light detectors 26A–26N. Other suitable distances can be used as contemplated by the user, depending on the physical limitations of the components chosen, as will become apparent to those skilled in the art.

The collimating lenses 48, 50 are mounted as necessary generally adjacent the light source 18 and the monitoring detector 32. Alternatively, the light source 18 and the monitoring detector 32 can have integral lenses, as would be known. Similarly, the lenses 52A–52N are mounted adjacent the light detectors 26A–26N. Again, each of the detectors 26A–26N can have integral lenses as would be known to those skilled in the art.

Upon activation of the light source 18, a portion of the light column 20 is split off or deflected by each of the beam splitters 22A–22N along the paths 24A–24N. Each of the deflected portions proceeding along the paths 24A–24N encounter the reflector 28 and are thus reflected back generally along the paths 24A–24N to their corresponding light detectors 26A–26N. In the event that any one of the paths 24A–24N is interrupted (i.e., such as by the hand of a machine operator being placed along any one of the paths 24A–24N), the indicator 27A–27N of the corresponding light detectors 26A–26N will immediately be triggered, such that a signal indicative of the detected condition (i.e., the presence of a part, a hand, debris or any item in the monitored area 12) is sent to a suitable control system of the type known in the art. The control system then takes the desired action as would be known to those skilled in the art.

Figure 2:
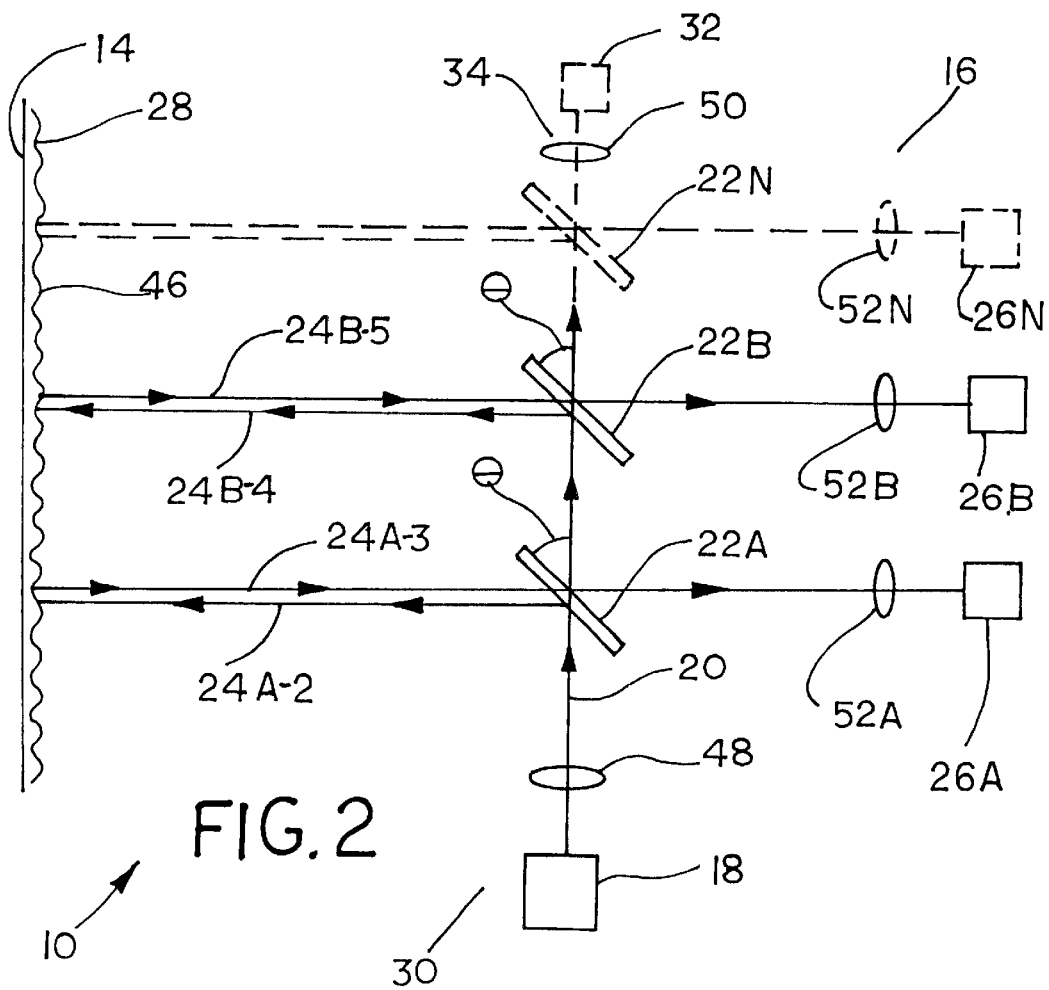
FIG. 2 is a fragmentary schematic diagram of a light curtain device similar to FIG. 1.

Further explanation of the operation is found in FIG. 2. The light column 20 intersects the beam splitter 22A and a portion of the light column 20 is directed along the path 24A-2 to the reflector 28. The light in path 24A-2 encounters the reflector 28 and proceeds toward the second location 16 along the path 24A-3. As shown, the path 24A-3 passes again through the beam splitter 22A and proceeds to the detector 26A. However, it is conceivable that, depending on the angle of the reflector 28 and the location of the detector 26A, the path 24A-3 may miss the beam splitter 22A. Similarly, the light column 20 intersects the beam splitter 22B and a portion of the light column 20 is directed along the path 24B-4 to the reflector 28. The light in path 24B-4 encounters the reflector 28 and proceeds toward the second location 16 along the path 24B-5. As shown, the path 24B-5 passes again through the beam splitter 22B and proceeds to the detector 26B. Again, the angles can be chosen so that the path 24B-5 does not intersect the beam splitter 22B.

Preferably, each of the light detectors are read sequentially in order to eliminate possible crosstalk between adjacent detectors and possible interference from external light sources. Further, the detectors can be sampled a plurality of times to provide verification of any detected breaks before the microprocessor 31 will generate an output to activate the red indicating light 35.

In further accordance with a preferred embodiment, the controller 31 can also be operatively connected to a higher level controller (not shown), as would be known to those skilled in the art. A transistor 43 can be provided as desired in order to provide a higher current output to the higher level controller. By operation of the controller 31, upon a detected break in any one of the light beams, the transistor 43 will be turned on.

Figure 4:
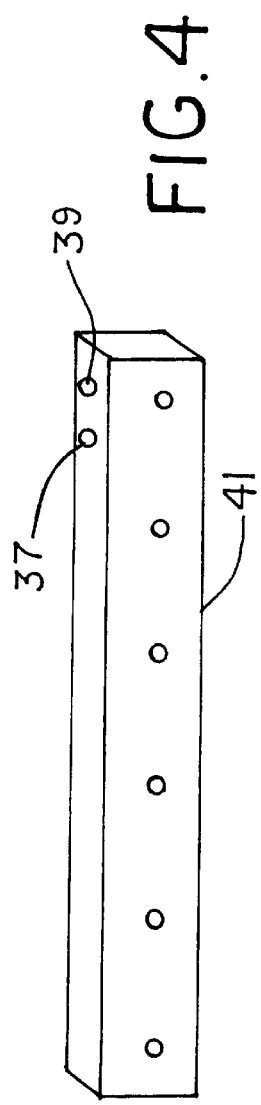
FIG. 4 is a schematic diagram similar to FIG. 1 but illustrating the active elements of the light curtain device in greater detail.

Preferably, all of the active elements including the light source 18, the beam splitters 22A–22N, the light detectors 26A–26N, the light monitor 32, and all of the lenses 48, 50, and 52A–52N are all disposed within a suitable housing 41, such as a housing 41 of the type shown in FIG. 4. The red and green indicating lights 35, 37 are viewable from without the housing 41.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive nor to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. For use with a reflector disposed adjacent a first location, a device for creating a curtain of light between the first location and a second location comprising:
    a light source adapted to provide a light column;
    a plurality of beam splitters disposed to intersect the light column, each of the beam splitters being spaced at intervals along the light column, each of the beam splitters being adapted to direct a deflected portion of the light column toward the first location for reflection by the reflector; and
    a plurality of light detectors disposed adjacent the second location, each of the light detectors being operatively associated with a corresponding one of the beam splitters, each of the light detectors being positioned to receive a corresponding deflected portion reflected by the reflector.

2. The light curtain device of claim 1, including an indicator arranged to indicate the interruption of any one of the one or more deflected portions.

3. The light curtain device of claim 1, in combination with the reflector.

4. The device of claim 1, wherein the light source is a vertical cavity surface emitting laser.

5. The device of claim 1, including a light monitor positioned to intersect the light column.

6. The device of claim 1, wherein the beam splitters are glass elements.

7. The device of claim 6, wherein the glass elements are generally planar and are disposed at a predetermined angle relative to the light column.

8. The device of claim 6, wherein the glass elements are adapted to provide reflection of about 8 percent.

9. The device of claim 6, wherein each of the glass elements includes a thickness of about 0.25 mm.

10. The device of claim 1, wherein the beam splitters are glass elements, and including a coating on each of the glass elements.

11. The device of claim 10 wherein the coating on each of the beam splitters is adapted so that the deflected portion directed by each of the beam splitters will have a similar relative intensity.

12. The device of claim 1, wherein the light source is adapted to provide a pulsing light column.

13. The device of claim 1, wherein each of the light detectors includes an adjustable trigger threshold, and further wherein the trigger threshold for each of the light detectors is set at a different level.

14. The device of claim 1, wherein the beam splitters are sawn Pyrex® wafers.

15. The device of claim 14, wherein the Pyrex® wafers have a thickness of about 0.5 mm.

16. The device of claim 1, wherein the reflector is a retroreflector stripe.

17. The device of claim 1, including a collimating lens positioned to intersect the light column.

18. The device of claim 1, including a collimating lens associated with each of the light detectors.

19. A device for creating a curtain of light between a first location and a second location comprising:
    a light source adapted to provide a light column;
    at least one beam splitter disposed to intersect the light column, the beam splitter being arranged to deflect at least a portion of the light column toward the first location;
    a reflector disposed adjacent the first location in a position to receive the deflected portion of the light column from the beam splitter, the reflector being arranged to reflect the deflected portion toward the second location;
    a light detector disposed adjacent the second location in a position to receive the deflected portion of the light column reflected by the reflector; and
    an indicator arranged to indicate the interruption of the portion of the light column.

20. The device of claim 19, wherein the light source is a vertical cavity surface emitting laser.

21. The device of claim 19, including a light monitor positioned to intersect the light column.

22. The device of claim 19, wherein the beam splitter is a generally planar glass slide, the glass slide being disposed at a predetermined angle relative to the light column, thereby deflecting the portion of the light column at a desired angle.

23. The device of claim 22, wherein the glass slide includes an optical coating.

24. The device of claim 22, wherein the glass slide is adapted to provide reflection of about 8 percent.

25. The device of claim 22, wherein the glass slide includes a thickness in the range of about 0.25 mm to about 1.0 mm.

26. The device of claim 19, including a first collimating lens positioned to intersect the light column, and further including a second collimating lens associated with the light detector.

27. A device for creating a curtain of light between a first location and a second location comprising:
    a light source adapted to provide a light column, a plurality of beam splitters disposed to intersect the light column at intervals, each of the beam splitters being adapted to direct a portion of the light column toward a corresponding reflector disposed adjacent the first location, each reflector being adapted to reflect the portion of the light column toward a corresponding light sensor disposed adjacent the second location, and an indicator arranged to indicate the interruption of any one of the one or more of the deflected portions.

28. The device of claim 27, wherein the light source is a pulsed vertical cavity surface emitting laser, and including a plurality of collimating lenses, at least one of the lenses being associated with the light column, at least another one of the lenses being associated with each of the light detectors, and further wherein the beam splitters comprise glass elements.

29. The device of claim 28, wherein the glass elements are generally planar and are disposed at a predetermined angle relative to a path of the light column so as to direct a corresponding portion of the light column to the second location.

30. The device of claim 28, wherein the glass elements have a thickness in the range of about 0.25 mm to about 1.0 mm, and further wherein the glass elements are coated so that the portion directed by each of the beam splitters will have a similar relative intensity.

31. The device of claim 28, wherein the reflector is a retroreflector stripe.

32. A device for creating a plurality of light beams between a first location and a second location comprising:

a single active light source adapted to provide a main light column;

a plurality of beam splitters disposed to intersect the main light column, each of the beam splitters being spaced at intervals along the main light column, each of the beam splitters being adapted to split a portion of light from the main light column and to direct its split portion of light toward the first location;

one or more reflectors disposed generally adjacent the first location, each of the one or more reflectors being positioned so that each split portion of light from the light column is reflected toward the second location; and one or more light detectors disposed generally adjacent the second location, each of the one or more light detectors being positioned so that each split portion of the light column is received by a corresponding one of the light detectors; and at least one indicator operatively associated with the light detectors, the indicator being arranged to indicate the interruption of at least any one of the split portions.

33. A device for creating a curtain of light between a first location and a second location comprising:

a light source adapted to provide a light column along a first path;

first and second beam splitters, each of the beam splitters being disposed at intervals along the first path to intersect the light column, the first beam splitter being adapted to direct a portion of the light column toward the first location along a second path, the second beam splitter being adapted to direct a portion of the light column toward the first location along a third path;

a reflector disposed adjacent the first location and being positioned to intersect the second and third paths, the reflector being adapted to direct a portion of the light column toward the second location along a fourth path, the reflector further being adapted to direct a portion of the light column toward the second location along a fifth path; and a light detector positioned to intersect the fourth and fifth paths.

34. The device of claim 33, including an indicator arranged to indicate the interruption of any of the light paths.

* * * * *